Sept. 20, 1932.  B. SLIPIKAS  1,878,299

AEROPLANE PARACHUTE

Filed April 22, 1931  2 Sheets-Sheet 1

INVENTOR

Benjamin Slipikas

Sept. 20, 1932.  B. SLIPIKAS  1,878,299
AEROPLANE PARACHUTE
Filed April 22, 1931  2 Sheets-Sheet 2
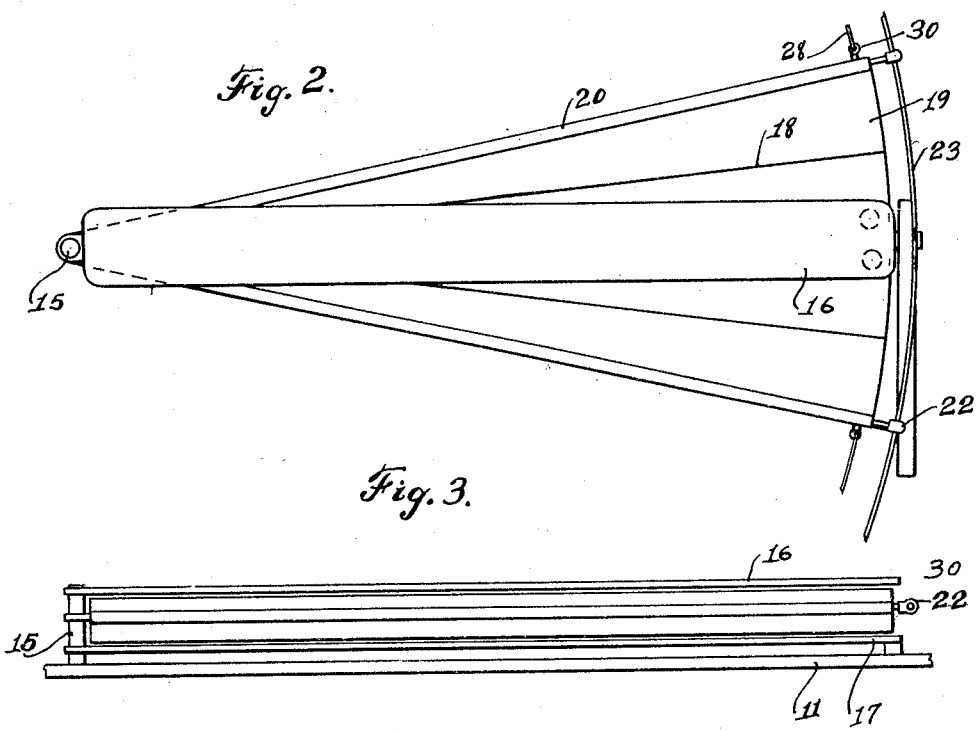
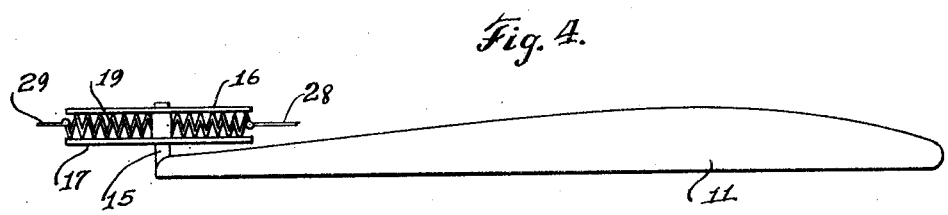
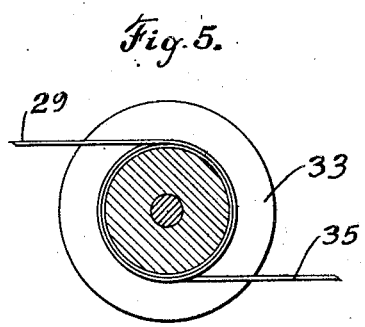
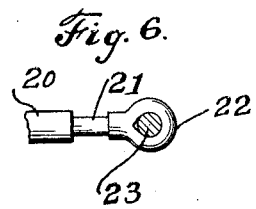
INVENTOR
Benjamin Slipikas Patented Sept. 20, 1932

1,878,299

UNITED STATES PATENT OFFICE

BENJAMIN SLIPIKAS, OF BROOKLYN, NEW YORK

AEROPLANE PARACHUTE

Application filed April 22, 1931. Serial No. 531,871.

This invention relates to improvements in aeroplanes, and it is the principal object of my invention to provide an aeroplane with means for preventing its rapid fall if the engine should become dead or for other causes, means which will keep the aeroplane afloat in the air and permit its gradual descent.

Another object of my invention is the combination of an aeroplane with a parachute normally folded, so as not to hinder the proper manipulation of the aircraft, while ready to unfold in case engine trouble develops or the aeroplane begins to fall from other causes.

A further object of my invention is the provision of an aeroplane equipped with a parachute the wings of which can be rapidly and readily operated by drums and cables to unfold or fold the parachute.

A still further object of my invention is the provision of an aeroplane combined with a parachute of comparatively simple and inexpensive construction, yet durable and efficient in operation.

These and other objects and advantages of my invention will become more fully known as the description thereof proceeds and will then be specifically defined in the appended claim.

In the accompanying drawings forming a material part of this disclosure:

Fig. 2 is a plan view showing one series of parachute wings partly folded.

Fig. 3 is a side elevation of the folded parachute wings.

Fig. 4 illustrates the arrangement of the parachute wings on a wing of the aeroplane.

Fig. 5 is a section through one of the cable drums.

Fig. 6 is a fragmentary detail view of the end of the parachute ribs.

Figure 1:
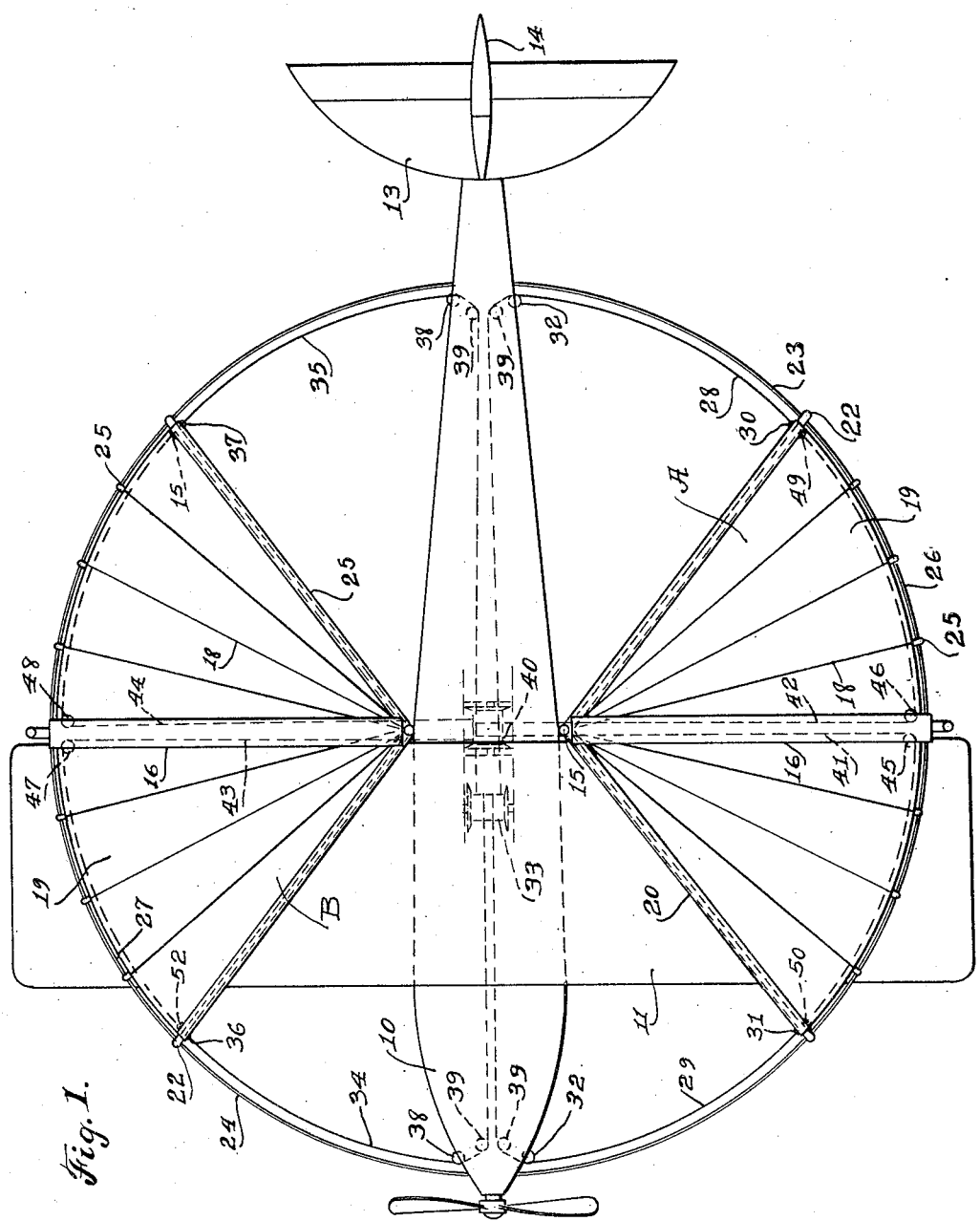
Fig. 1 is a plan view of an aeroplane constructed according to my invention.

As illustrated, an aeroplane including its fuselage 10, wing 11, propeller 12, horizontal rudder 13, and vertical rudder 14, has attached to its wing supports 15 for upper and lower brackets 16, 17, spaced from each other on the supports.

Into the space between both brackets is adapted to fold a parachute composed of the two sections A and B each comprising a plurality of ribs 18 between which the material of the parachute 19 is foldably arranged in the manner of the material of an umbrella.

The outer edge of the material of each section is attached to rods or bars 20.

The ribs and bars extend radially from the support 15, and the outer ends of the rods or bars 20 are reduced, as at 21 and carry eyes 22 through which are guided semi-circular hoops 23, 24, for sections A and B respectively while rings 25 at the outer ends of the ribs 18 have guided therethrough similar hoops 26, 27, and the inner ends of all of the hoops are suitably attached to the fuselage.

Cables 28, 29, of section A of the parachute are attached at one end to eyes 30, 31 of bars 20 while their other ends are guided over rollers 32 and over a drum 33.

Similar cables 34, 35, of section B are attached at one end to eyes 36, 37, of the rods 20 of this section while their other ends are guided over rollers 38, 39, on the fuselage and also over drum 33 to allow an opening of the parachute wings by a suitable operation of the drum.

A centrally located drum 40 has wound upon the same the ends of cables 41, 42, of section A and of cables 43, 44, of section B, the other ends of which are guided over rollers 45, 46, and 47, 48, respectively and secured to eyes 49, 50, and 51, 52, respectively of the rods 20 of sections A and B respectively.

The device operates as follows:—

When the engine of the aeroplane stalls or the same becomes unmanageable for any other reason, the operator turns drum 33 to unfold by means of cables 28, 29, 34, 35, the parachute wings of sections A and B to offer a supporting and carrying surface allowing the aeroplane to descend gradually.

If the parachute wings are to be folded in the spaces between brackets 16, 17, drum 40 is operated to draw the bars 20 into this space by means of cables 41, 42, and 43, 44, respectively and the parachute will not hinder the proper operation of the aeroplane.

It will be clear that I may make such changes in the construction of my parachute-aeroplane as disclosed in the specification and drawings as come within the scope of the appended claim without departure from my invention.

Having thus described my invention what I claim as new and desire to secure by Letters Patent is:

In a combined aeroplane and sectional parachute, a plurality of semi-circular hoops attached at their ends to said aeroplane, ribs guided along said hoops between which the material of the parachute is foldably arranged, rods at the outer ends of said material, eyes on said rods adapted to slide along said hoops during the folding and unfolding of the parachute, means for supporting the sections of said parachute on the aeroplane, spaced brackets between which the parachute sections can be folded, cables attached to the parachute sections, a drum over which said cables are guided and allowing an unfolding of the parachute sections, a central drum and cables guided over said central drum and attached to said parachute sections for allowing a folding of the parachute sections.

Signed at Brooklyn, in the county of Queens, and State of New York, this 24th day of March A. D. 1931.

BENJAMIN SLIPIKAS.